(12) United States Patent
Jung et al.

(10) Patent No.: US 7,283,748 B2
(45) Date of Patent: Oct. 16, 2007

(54) SELF-HEALING WAVELENGTH DIVISION MULTIPLEXING-PASSIVE OPTICAL NETWORK SYSTEM

(75) Inventors: Dae-Kwang Jung, Suwon-shi (KR); Yun-Je Oh, Yongin-shi (KR); Seong-Taek Hwang, Pyeongtaek-shi (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 656 days.

(21) Appl. No.: 10/721,712

(22) Filed: Nov. 25, 2003

(65) Prior Publication Data
US 2005/0008362 A1  Jan. 13, 2005

(30) Foreign Application Priority Data
Jul. 7, 2003 (KR) ............ 10-2003-0045887

(51) Int. Cl.
H04J 14/00 (2006.01)
G02F 1/00 (2006.01)

(52) U.S. Cl. .............. 398/72; 398/71; 398/70; 398/2; 398/5

(58) Field of Classification Search ............ 398/70, 398/71, 72, 2, 5, 12, 19
See application file for complete search history.

(56) References Cited

U.S. PATENT DOCUMENTS 4,306,313 A  12/1981 Baldwin ............ 455/601
5,241,610 A  8/1993 Labiche et al. ............ 385/16
5,539,564 A * 7/1996 Kumozaki et al. ............ 398/2
6,324,318 B1  11/2001 Suzuki ............ 385/24
6,975,586 B1 * 12/2005 Yoshimura ............ 370/217

FOREIGN PATENT DOCUMENTS

| CN | 1338832 | 3/2002 |
| EP | 1041852 A2 | 10/2000 |
| WO | WO 99/44317 | 9/1999 |

* cited by examiner

Primary Examiner—M. R. Sedighian
(74) Attorney, Agent, or Firm—Cha & Reiter, L.L.C.

(57) ABSTRACT

A self-healing WDM (Wavelength Division Multiplexing)-PON (Passive Optical Network) system is disclosed and includes a CO (Central Office), a RN (Remote Node) and a plurality of subscriber units. The system includes a trunk working fiber and a trunk protection fiber for connecting the CO with the RN, a distribution working fiber, and a distribution protection fiber for connecting the RN with the subscriber units. The CO is connected to the trunk working fiber and the trunk protection fiber, and contains an optical switching unit switched when an error or communication failure occurs, an upstream working optical receiver and an upstream protection optical receiver for receiving upstream data, and a downstream working light source and a downstream protection light source for transmitting downstream data. Each subscriber unit is connected to the distribution working fiber and the distribution protection fiber, and contains an optical switching unit switched when an error or communication failure occurs, a downstream working optical receiver and a downstream protection optical receiver for receiving downstream data, and an upstream working light source and an upstream protection light source for transmitting downstream data.

19 Claims, 10 Drawing Sheets

SELF-HEALING WAVELENGTH DIVISION MULTIPLEXING-PASSIVE OPTICAL NETWORK SYSTEM

CLAIM OF PRIORITY

This application claims priority to an application entitled "SELF-HEALING WAVELENGTH DIVISION MULTIPLEXING-PASSIVE OPTICAL NETWORK SYSTEM," filed in the Korean Intellectual Property Office on Jul. 7, 2003 and assigned Serial No. 2003-45887, the contents of which are hereby incorporated by reference.

BACKGROUND OF THE INVENTION

1. Field of the Invention

The present invention relates to a WDM (Wavelength Division Multiplexing)-PON (Passive Optical Network) system, and more particularly, to a self-healing WDM-PON system for detecting malfunction and degradation problems of an upstream/downstream light source along with disconnection and degradation problems of a trunk line and a distribution fiber, and to automatically recover from such problems.

2. Description of the Related Art

Typically, a WDM-PON system provides subscribers with super high-speed broadband communication services using unique wavelengths assigned to the subscribers. Therefore, the WDM-PON system can guarantee communication confidentiality and easily accommodates an additional communication service requested by individual subscribers or increased communication capacity. Further, the WDP-PON system easily increase the number of subscribers by further including a unique wavelength assigned to a new subscriber. However, the aforementioned WDM-PON system must use an additional wavelength stabilizer for controlling a CO (Central Office) and individual subscriber ends to stabilize a light source of a specified lasing wavelength and a wavelength of the light source. This results in a high costs assessed to the subscriber. The WDM-PON system is not commercially available due to the high costs assessed to the subscriber. In order to implement a cost-effective WDM-PON system, there have recently been developed a spectrum-sliced broadband light source capable of easily managing wavelengths. This includes a mode-locked Fabry-Perot laser with incoherent light, and a reflective semiconductor optical amplifier (SOA) as WDM light sources.

Typically, the WDM-PON system adapts a double-star structure to minimize the length of an optical line. In more detail, a single feeder fiber connects the CO with a RN (Remote Node) located in a nearby area of subscribers, and an independent distribution fiber connects the RN to the individual subscribers. A multiplexed downstream signal is transferred to the RN via a trunk fiber and is demultiplexed by a multiplexer/demultiplexer contained in the RN. The demultiplexed signal is then transferred to individual subscriber units via the distribution fiber. Upstream signals created from the subscriber units are transferred to the RN, and are applied to the multiplexer/demultiplexer contained in the RN. The upstream signals are multiplexed by the multiplexer/demultiplexer, and are then transferred to the CO.

The WDM-PON system transfers large amounts of data at a high transfer rate via wavelengths assigned to individual subscribers. In such systems, unexpected malfunction and degradation incidents of an upstream or downstream light source occur or disconnection and degradation incidents of a trunk line and a distribution fiber occur. This may cause the WDM-PON system to lose large amounts of data even though such an incident is maintained for a short period of time. Therefore, there is a need for the WDM-PON system to quickly detect such an incident and recover from the incident.

However, if such an unexpected incident occurs, a direct communication circuit between the CO and the subscriber unit is broken, such that a communication mode between the CO and the subscriber is disabled. To solve this problem, the WDM-PON system may further use a low-speed communication circuit, resulting in an additional cost for managing/monitoring the low-speed communication circuit located between the CO and each subscriber unit. The CO and the subscriber communicate with each other via the low-speed communication circuit in order to determine whether an unexpected incident occurs, and may use a predetermined period of time to inform an administrator of such an incident. This results in an increased communication failure notification time between the CO and the subscriber unit. Therefore, there must be developed a self-healing WDM-PON system that quickly recognizes either malfunction and degradation problems of an upstream/downstream light source or disconnection and degradation problems of a trunk fiber and a distribution fiber in an implemented optical link configuration. Further, such a self-healing system should automatically recover from the detected malfunction, disconnection and degradation problems.

Typically, a WDM optical communication network system configures a plurality of optical communication nodes arranged at regular intervals in the form of a ring network in order to automatically recover from unexpected problems. Such unexpected problems include a disconnection or degradation of a transmission optical fiber. There has been initially proposed a four-strand self-healing ring optical network composed of a two-strand working fiber and a two-strand protection fiber in order to implement two-way communication. With the increasing development of a two-way communication technique using one-strand fiber, there has recently been proposed a ring optical network. Such a system is composed of one-strand working fiber and one-strand protection fiber to reduce the number of transmission fibers and implement such two-way communication.

Figure 1:
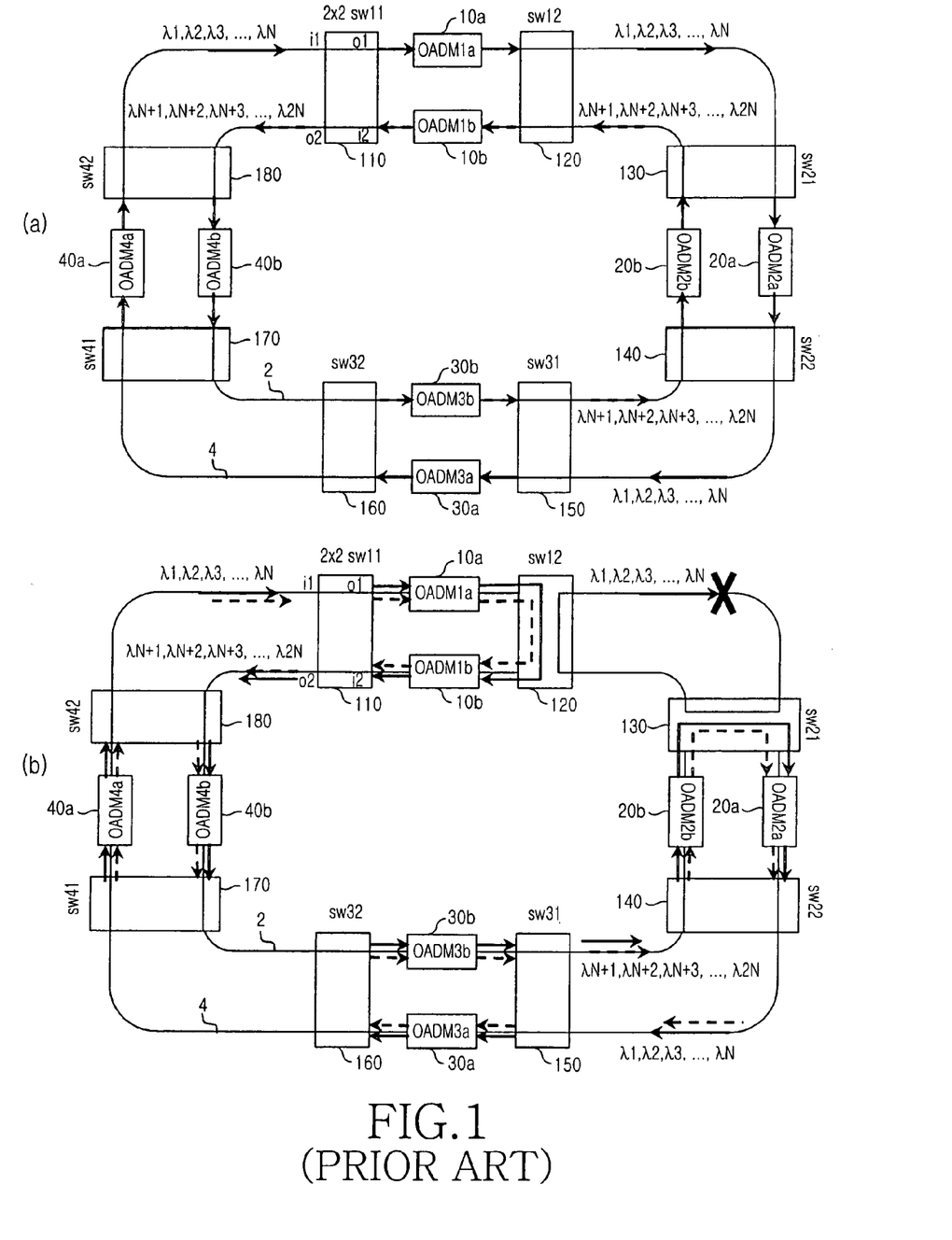
FIG. 1a is a block diagram illustrating a two-way optical communication network system using a conventional link protection switching scheme.
FIG. 1b is a block diagram illustrating a protection switching scheme used for the two-way optical communication network system.

FIG. 1a is a block diagram of a conventional self-healing ring optical network. The self-healing ring optical network uses a protection switch method for recovering from a communication failure of the transmission fiber using a loop-back scheme. Individual nodes of the ring optical network system are comprised of optical add-drop multiplexer/demultiplexers (OADMs) 10a~40a and 10b~40b and 2×2 switching units 110~180, which is used for protection switching. In this case, the OADM demultiplexes a multiplexed optical signal transferred via inside and outside ring fibers, drops a signal having a wavelength assigned to each node, modulates the signal having the wavelength according to transmission data, and multiplexes the modulated signal having the same wavelength along with other demultiplexed signals. The outside ring fiber 4 transmits optical signals having wavelengths $\lambda 1$, $\lambda 2$, $\lambda 3$, ..., $\lambda N$ in a clockwise direction. The inside ring fiber 2 transmits optical signals having wavelengths $\lambda N+1$, $\lambda N+2$, $\lambda N+3$, ..., $\lambda 2N$ in a counterclockwise direction.

FIG. 1b is a block diagram illustrating a protection switching scheme for a transmission fiber link according to the loop-back principle. As shown in FIG. 1b, if a communication failure occurs in the transmission fiber link, the optical network system adapts an optical signal as a loop-back signal using two 2×2 optical switching units located at both ends of an erroneous link. The optical system then transmits the optical signal serving as the loopback signal in an opposite direction in such a way that the protection switching can be performed. For example, if a communication failure occurs in an optical fiber link for connecting the OADM 10a with the OADM 20a as shown in FIG. 1b, the optical signals λ1, λ2, λ3, . . . , λN transferred from the OADM 10a to the OADM2a 20a return to the OADM 10b via the switching unit 120. The OADM 10b then transmits the received optical signals in a counter clockwise direction via the inside ring fiber 2. The optical signals λ1, λ2, λ3, . . . , λN transferred via the inside ring fiber 2 are transferred from the OADM 20b to the OADM 20a in such a way that signal switching is performed.

If the ring network system is normally operating, the 2×2 optical switching units 110~180 are in a bar state, a signal received at an input terminal i1 is transferred to an output terminal o1, and a signal received at an input terminal i2 is transferred to an output terminal o2. However, if the ring network system is operating abnormally, the 2×2 optical switching units 110~180 are in a cross state. Thus, the signal applied to the input terminal i1 is transferred to the output terminal o2, and the signal applied to the input terminal o2 is transferred to the output terminal o1.

If the optical switching unit 130 shown in FIG. 1b is in a cross state, a signal passing through an erroneous link and optical signals having wavelengths λN+1, λN+2, λN+3, . . . , λ2N transferred from the OADM 20b to the OADM 10b in a counter clockwise direction are adapted as loop-back signals. The signal is thereby transferred via the outside ring fiber 4 in a clockwise direction, and is transferred from the OADM 10a to the OADM 10b via the optical switching unit 120. The optical switching unit located at a node nonadjacent to the erroneous node remains in a bar state without any state conversion.

The self-healing WDM ring optical network system configures a plurality of nodes in the form of a ring. Although a transmission fiber may be disconnected, nodes can still communicate with each other using another fiber arranged in the opposite direction to the disconnected transmission fiber. Thus, the self-healing WDM ring optical network system quickly recovers from a communication failure caused by the disconnected fiber, and thereby maintains a communication state between the nodes.

However, since the nodes are interconnected in the form of a ring, a number of steps must be performed. These include receiving common signals multiplexed/demultiplexed by a multiplexer/demultiplexer. Further the received common signals being output without any change, drop and receive a signal having a wavelength corresponding to each node, and add the same wavelength signal modulated with transmission data to the common signals. Thus, the aforementioned self-healing WDM ring optical network system must use an OADM using a high-priced wavelength division multiplexer/demultiplexer. If large amounts of an optical power is lost in multiplexing/demultiplexing signals at individual nodes, the self-healing WDM ring optical network system must also use an optical amplifier to compensate for the lost power, resulting in an increased system cost. Therefore, the conventional self-healing WDM ring optical network system is not applicable to the WDM-PON system focused on economical efficiency.

SUMMARY OF THE INVENTION

Therefore, the present invention has been made in view of the above problems, and it is an object of the present invention to provide a cost-effective self-healing WDM-PON system.

In accordance with the present invention, the above and other objects are accomplished by the provision of a WDM (Wavelength Division Multiplexing)-PON (Passive Optical Network) apparatus having a CO (Central Office), a RN (Remote Node) connected to the CO and a plurality of subscriber units via a fiber. The apparatus includes a trunk working fiber and a trunk protection fiber for connecting the CO with the RN, a distribution working fiber, and a distribution protection fiber for connecting the RN with the subscriber units.

The CO is connected to the trunk working fiber and the trunk protection fiber. The Co contains a 2×2 optical switching unit switched when an error or communication failure occurs, an upstream working optical receiver and an upstream protection optical receiver for receiving upstream data, a downstream working light source and a downstream protection light source for transmitting downstream data. Each of the subscriber units is connected to the distribution working fiber and the distribution protection fiber. Each of the subscriber units contain a 2×2 optical switching unit switched when an error or communication failure occurs, a downstream working optical receiver and a downstream protection optical receiver for receiving downstream data, and an upstream working light source and an upstream protection light source for transmitting downstream data.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, embodiments of the present invention will be described in detail with reference to the annexed drawings.

In the drawings, the same or similar elements are denoted by the same reference numerals even though they are depicted in different drawings. For the purposes of clarity and simplicity, a detailed description of known functions and configurations incorporated herein will be omitted as it may make the subject matter of the present invention unclear.

According to the present invention, a self-healing WDM-PON system connects a redundant component with each element of the general WDM-PON system in order to recover from an error or communication failure. If the error or communication failure occurs in the general WDM-PON system, the self-healing WDM-PON system according to the present invention can heal the error or communication failure using the redundant component.

Figure 2:
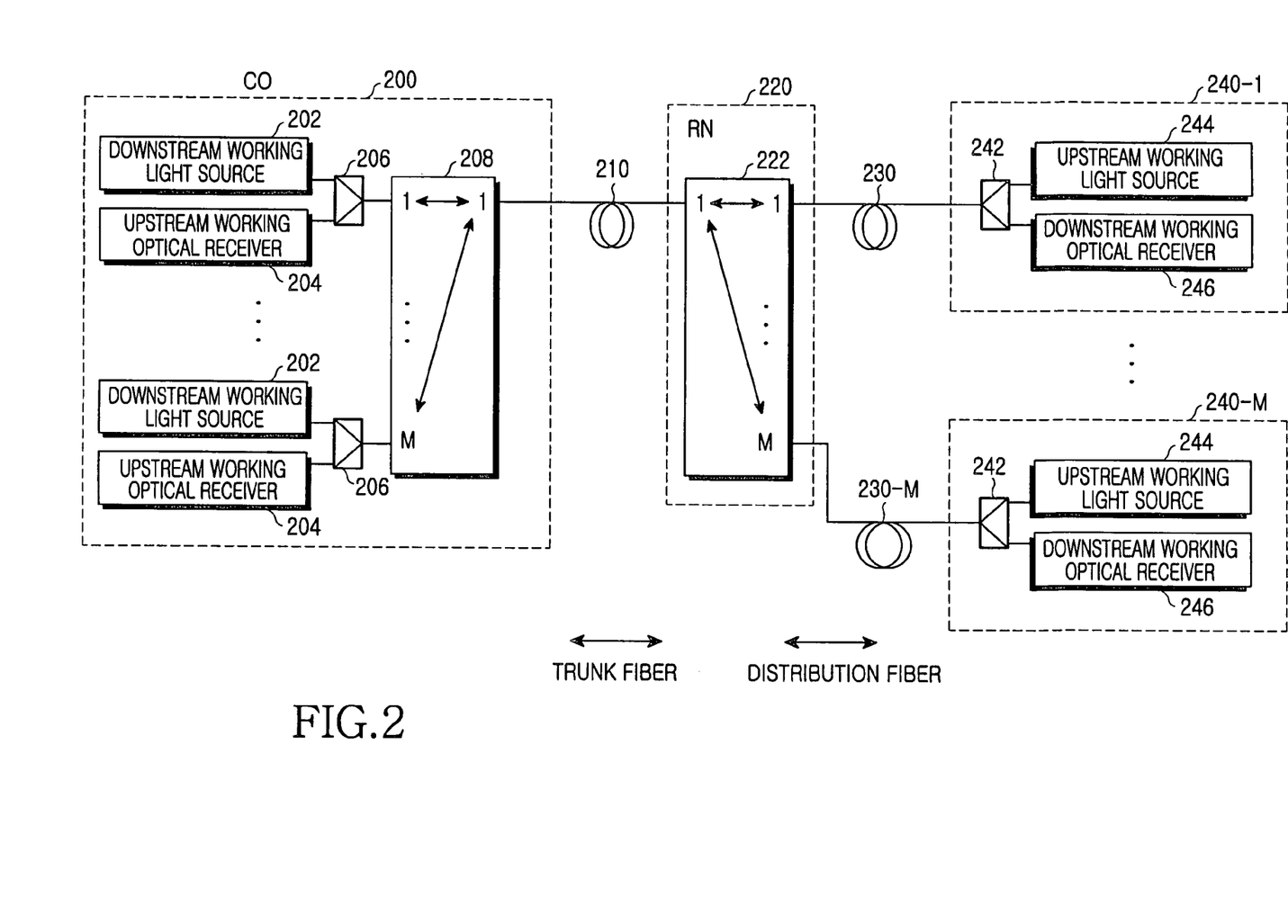
FIG. 2 is a block diagram of a general WDM-PON system.

FIG. 2 is a block diagram of a general WDM-PON system. As shown in FIG. 2, the WDM-PON system includes a CO (Central Office) 200, one-strand working fiber 210 for connecting the CO 200 with the RN 220, a RN (Remote Node) 220 having a 1×M WGR (Waveguide Grating Router), a number of other one-strand working fibers 230 for connecting the RN 220 with individual subscriber units 240, and a plurality of subscriber units 240.

The CO includes a downstream light source 202 and an upstream working optical receiver 204 for each of the individual subscribers, a wavelength division multiplexer 206 for adding/dropping upstream/downstream signals, and an M×1 WGR (Waveguide Grating Router) 208. Each subscriber unit 240 includes an upstream working light source 244, a downstream working optical receiver 246, and a wavelength division multiplexer (WDM) 242 for adding/dropping upstream/downstream signals.

If an error or communication failure occurs in either one of internal components contained in the general WDM-PON system, the general WDM-PON system cannot automatically heal a corresponding erroneous component. Therefore, it cannot restore itself to a normal state.

Figure 3:
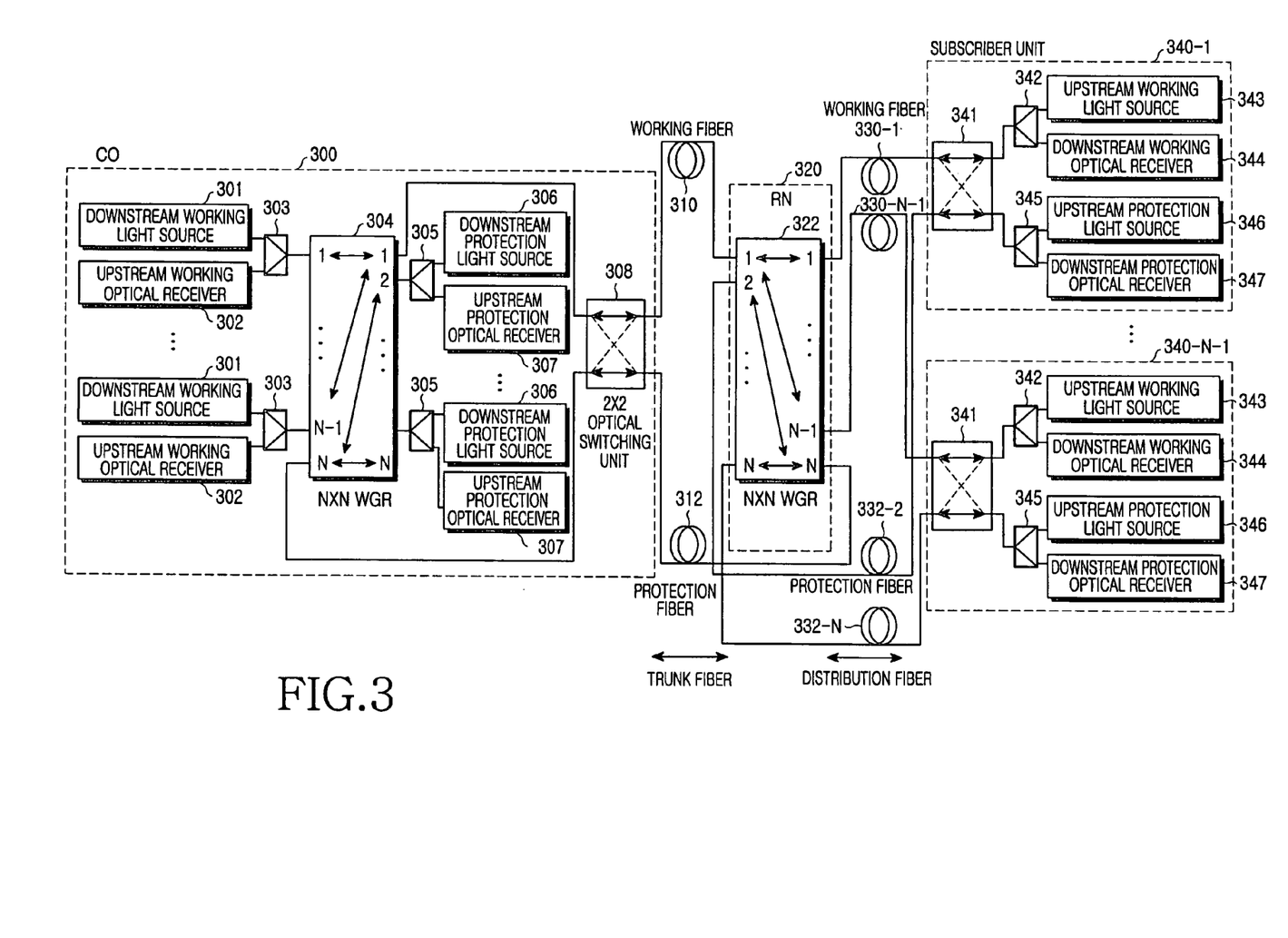
FIG. 3 is a block diagram of a WDM-PON system in accordance with one embodiment of the present invention.

FIG. 3 is a block diagram of a WDM-PON system in accordance with one embodiment of the present invention. As shown in FIG. 3, the WDM-PON system according to the present invention further includes protection components for protecting individual components. In more detail, the WDM-PON system includes a protection trunk fiber 312 functioning as a working fiber located between the CO 300 and the RN 320. Thus, if an error arises in the one-strand trunk fiber, the protection trunk fiber 312 functions as a working fiber. Furthermore, the WDM-PON system of FIG. 3 also includes a protection distribution fiber 332 that functions as a working fiber located between the RN 320 and individual subscriber units when an error arises in the individual distribution fibers 330 for connecting the RN 320 with the subscriber units.

The CO 300 and the subscriber units 340 of the WDM-PON system include protection components for protecting individual elements, respectively. In more detail, the CO 300 includes a downstream working light source 301 and an upstream working optical receiver 302 for each of the individual subscribers; a WDM 303 for adding/dropping upstream/downstream signals needed for the downstream working light sources 301 and the upstream working optical receiver 302; and a downstream protection light source 306 and an upstream protection optical receiver 307. Another WDM 305 for adding/dropping upstream/downstream signals needed for the downstream protection light sources 306 and the upstream protection optical receiver 307, a N×N WGR 304, and a 2×2 optical switching unit 308.

Each subscriber unit 340 includes an upstream working light source 343 and a downstream working optical receiver 344; a WDM 342 for adding/dropping upstream/downstream signals needed for the upstream working light source 343 and the downstream working optical receiver 344; and an upstream protection light source 346 and a downstream protection optical receiver 347. A WDM 345 for adding/dropping upstream/downstream signals needed for the upstream protection light source 346 and the downstream protection optical receiver 347, and a 2×2 optical switching unit 341.

If no error or communication failure occurs in the self-healing WDM-PON system, the self-healing WDM-PON system will operate as follows. In the case of transferring a downstream signal from the CO 300 to the subscriber unit 340, the downstream working light source 301 modulates a signal with transmission data. The modulated signal is then applied to the N×N WGR 304, and multiplexed. The multiplexed downstream signal passes through a 2×2 optical switching unit 308 in a bar state and is transferred to an RN 320 via the trunk fiber 310. The multiplexed down stream signal is demultiplexed by an N×N WGR 322 contained in the RN 320. Individual demultiplexed downstream signals are transferred to distribution fibers 330 and are applied to corresponding subscriber units 340. In the subscriber units 340, the downstream signals pass through 2×2 optical switching units 341, and are applied to downstream working optical receiver 344 via WDMs 342 in such a way that they are detected as electric signals.

In the case of transferring an upstream signal from the subscriber unit 340 to the CO 300, the upstream working light source 343 modulates a signal with transmission data. The modulated signal is applied to the WDM 342 and the optical switching units 341, and is transferred to the RN 320. Individual upstream signals applied to the RN 320 are multiplexed by the WGR 322, and are transferred to the CO 300. Multiplexed upstream signals pass through the optical switching unit 308 contained in the CO 300 and are demultiplexed by the WGR 304. The demultiplexed upstream signals are applied to the upstream working optical receiver 302 over the WDM 303 in such a way that they are detected as electric signals.

Figure 4:
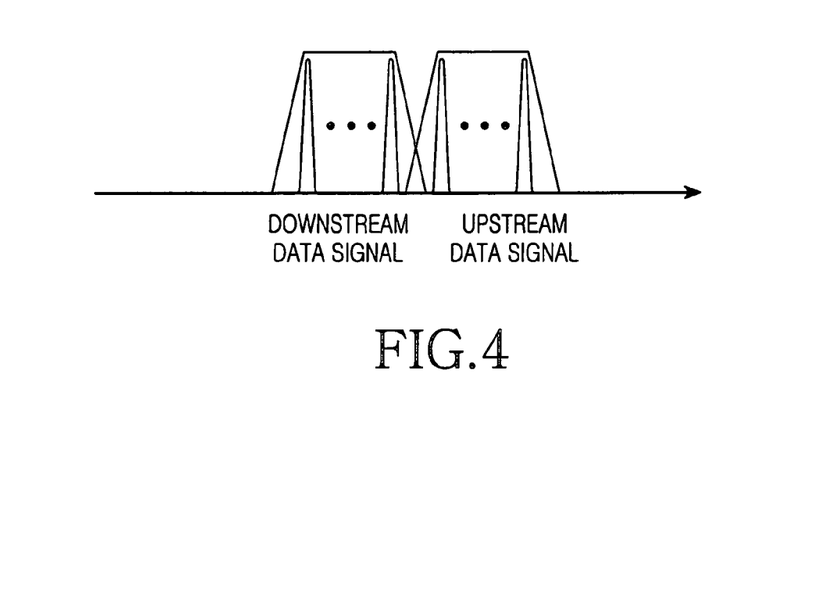
FIG. 4 depicts a waveform diagram illustrating a wavelength band of a downstream light source and a wavelength band of an upstream light source in accordance with one embodiment of the present invention.
Figure 5:
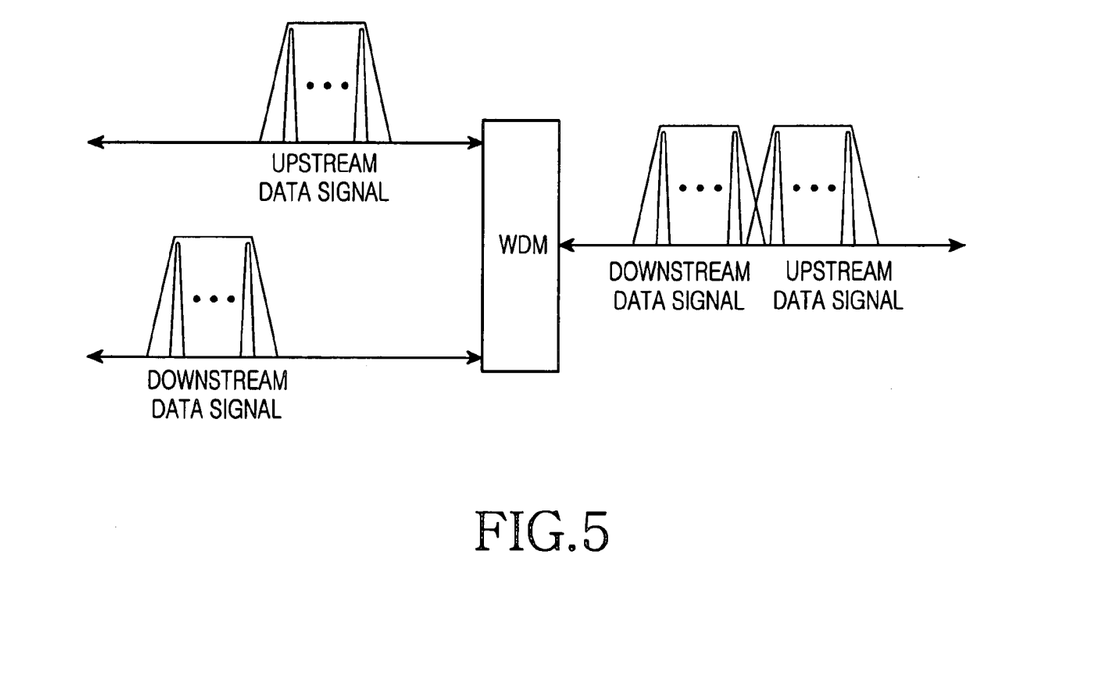
FIG. 5 depicts a waveform diagram illustrating output signal characteristics of a WDM located between a CO and a subscriber unit in accordance with one embodiment of the present invention.

FIG. 4 depicts a waveform diagram illustrating a wavelength band of a downstream light source and a wavelength band of an upstream light source in accordance with one embodiment of the present invention. As shown in FIG. 4, a two-way WDM-PON system for simultaneously transmitting upstream/downstream signals over a one-strand optical fiber allocates a downstream wavelength band and an upstream wavelength band differently from each other. The WGR serving as a multiplexer/demultiplexer is configured to form an FSR (Free Spectral Range), and has a periodic pass characteristic, such that it can simultaneously multiplex/demultiplex upstream/downstream signals using one WGR even though upstream and downstream wavelength bands are separated from each other. A pass characteristic of the WDM contained in the CO and the subscriber unit is graphically shown in FIG. 5.

If an error or communication failure arises in the self-healing WDM-PON system, the self-healing WDM-PON system will operate as follows.

Figure 6A:
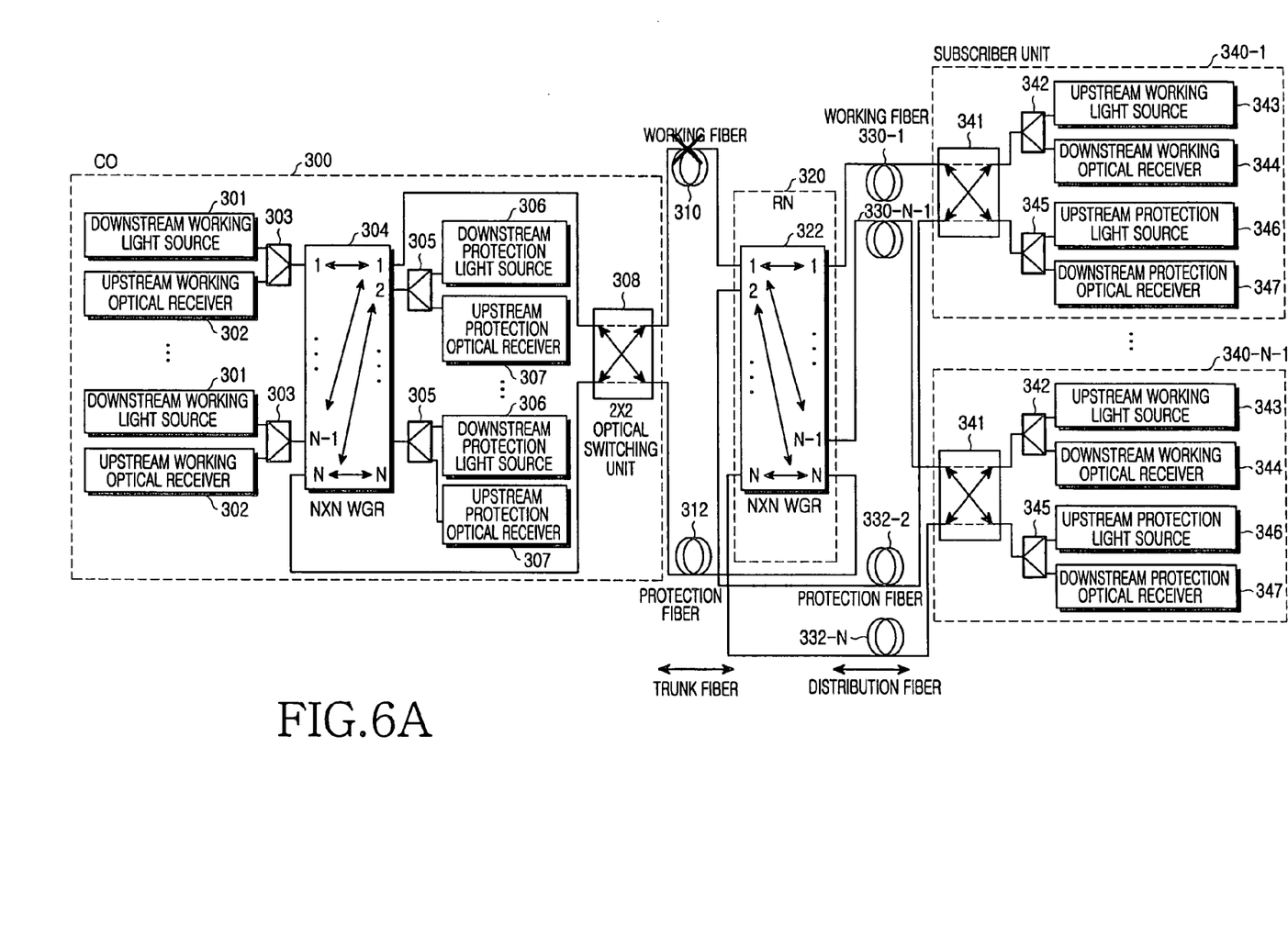
FIGS. 6a~6b are block diagrams illustrating operations performed when a communication failure occurs in a transmission fiber of the WDM-PON system in accordance with one embodiment of the present invention.
Figure 6B:
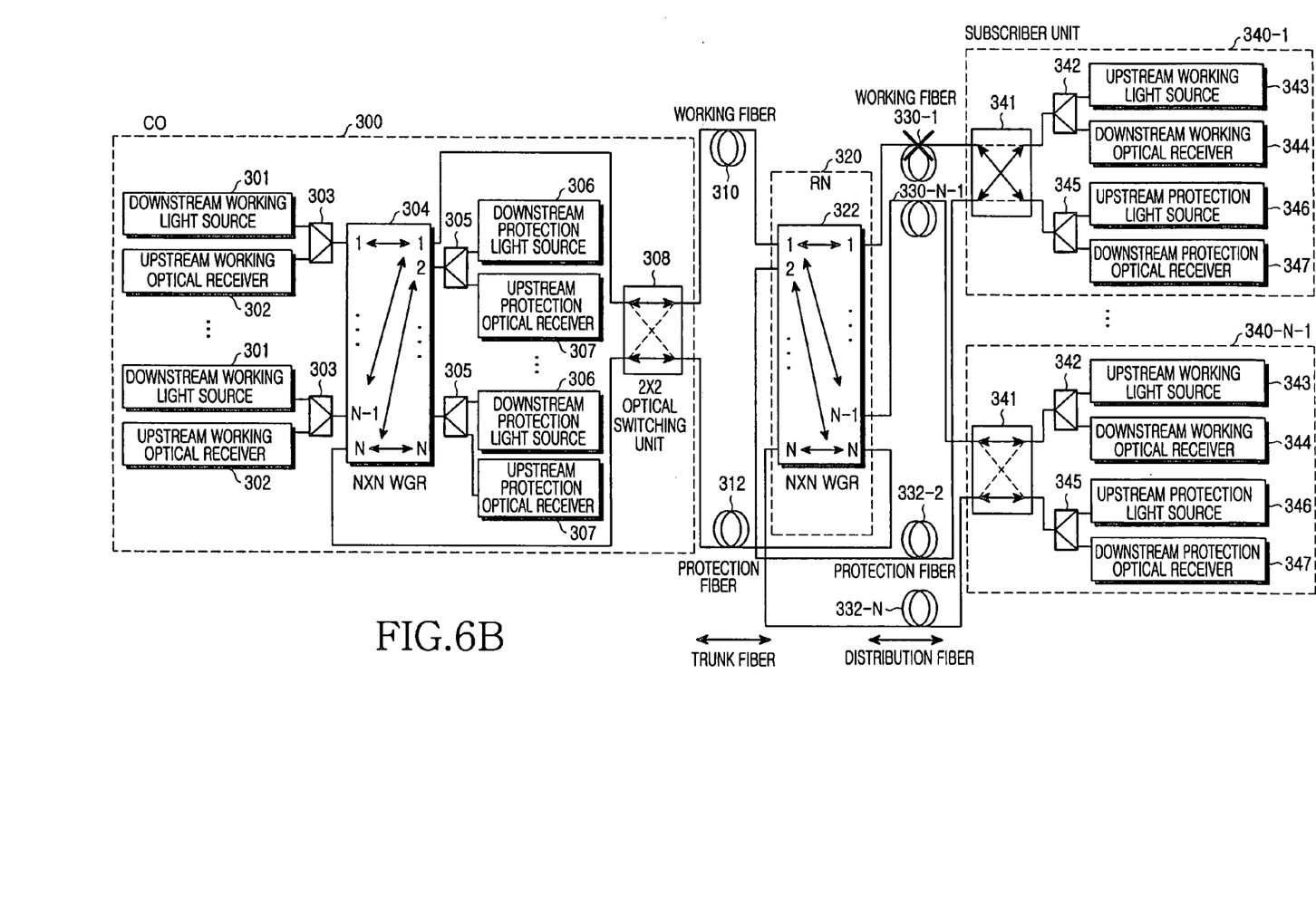

FIGS. 6a~6b are block diagrams illustrating processes performed if a communication failure occurs in a transmission fiber of the WDM-PON system in accordance with one embodiment of the present invention. FIG. 6a is a block diagram illustrating a process performed when an error or communication failure occurs in a trunk working fiber, and FIG. 6b is a block diagram illustrating a process performed when an error or communication failure occurs in a distribution fiber.

Referring to FIG. 6a, if an error or communication failure occurs in the trunk working fiber 310, output signals applied to all the upstream working optical receivers 302 contained in the CO 300 and output signals applied to all the downstream working optical receivers 344 contained in all subscriber units are not received. Thus the CO 300 and the subscriber units 340-1 to 340-N-1 changes the 2×2 optical switching units 308 and 341 into cross states in such a way that the CO 300 can communicate with the individual subscribers over the trunk protection fiber 312.

For example, in the case of transferring a downstream signal from the CO 300 to the subscriber units 340, the downstream working light source 301 modulates a signal with transmission data. The modulated signal is applied to the WDM 303 and the N×N WGR 304 serving as a multiplexer/demultiplexer, and is multiplexed by the N×N WGR 304. The multiplexed downstream signal passes through the 2×2 optical switching unit 308 in a cross state, and is transferred to the RN 320 via the trunk protection fiber 312. The downstream signal is demultiplexed by the N×N WGR 322 contained in the RN 320, and is transferred to individual subscriber units 340-1 to 340-N-1 over distribution protection fibers 332.

In this case, the individual demultiplexed signals are transferred from the RN 320 to the subscriber units 340-1 to 340-N-1 over the distribution protection fibers 332. Thus, the 2×2 optical switching units 341 of the subscriber units 340-1 to 340-N-1 are changed to a cross state in such a way that downstream signals are received from the distribution protection fibers 332.

Referring to FIG. 6b, if an error or communication failure occurs in the distribution working fiber 330-1, an output signal applied to a corresponding upstream working optical receivers 302 contained in the CO 300 and an output signal applied to a corresponding downstream working optical receiver 344 contained in the subscriber unit 340-1 are not received. Thus, the 2×2 optical switching unit 341 contained in the subscriber unit 340-1 changes into a cross state so that the CO 300 can communicate with the subscriber unit 340-1 over the distribution protection fiber 332-2.

Figure 7A:
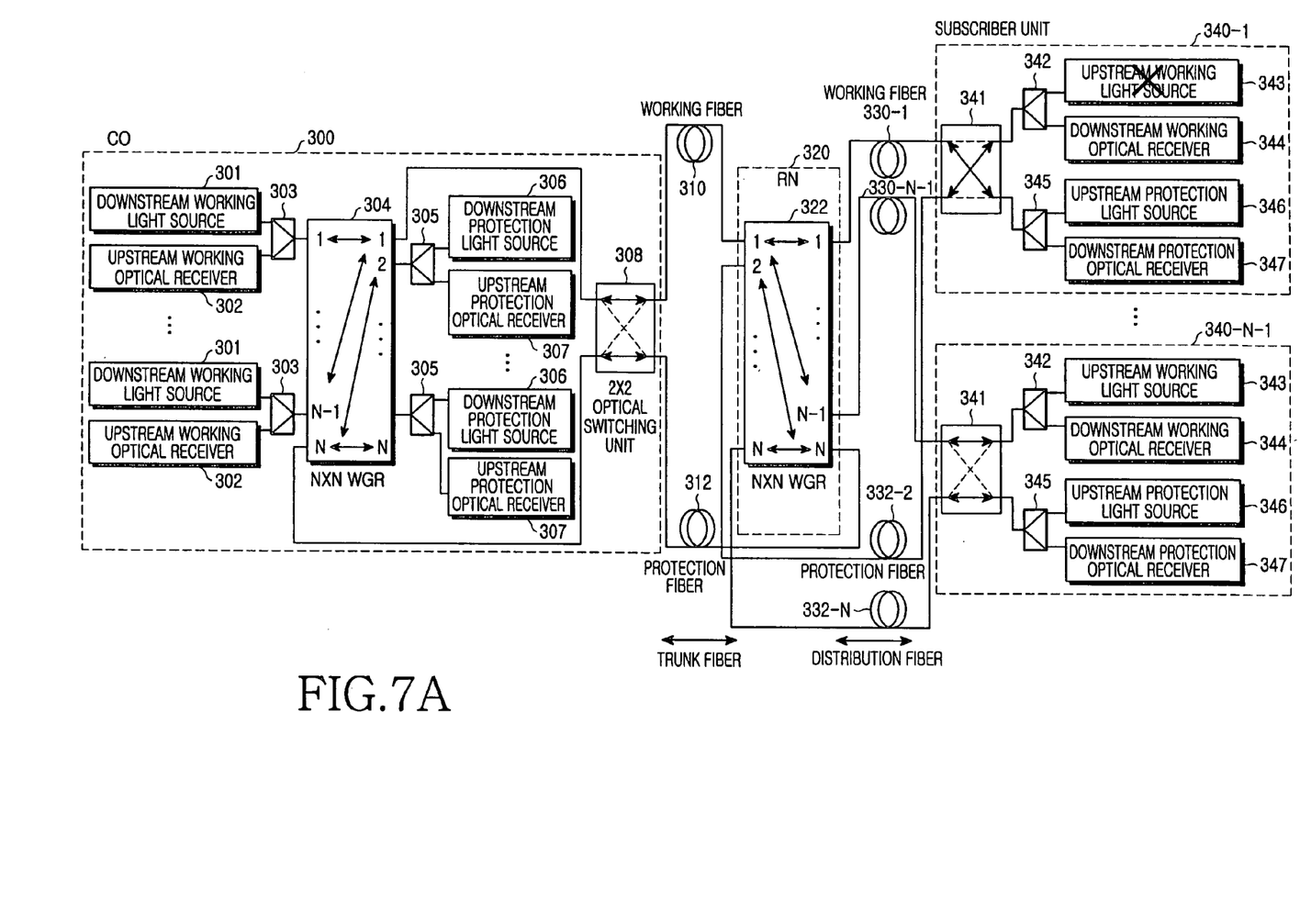
FIGS. 7a~7b are block diagrams illustrating operations performed when a communication failure occurs in internal elements contained in the subscriber unit of the WDM-PON system in accordance with one embodiment of the present invention.
Figure 7B:
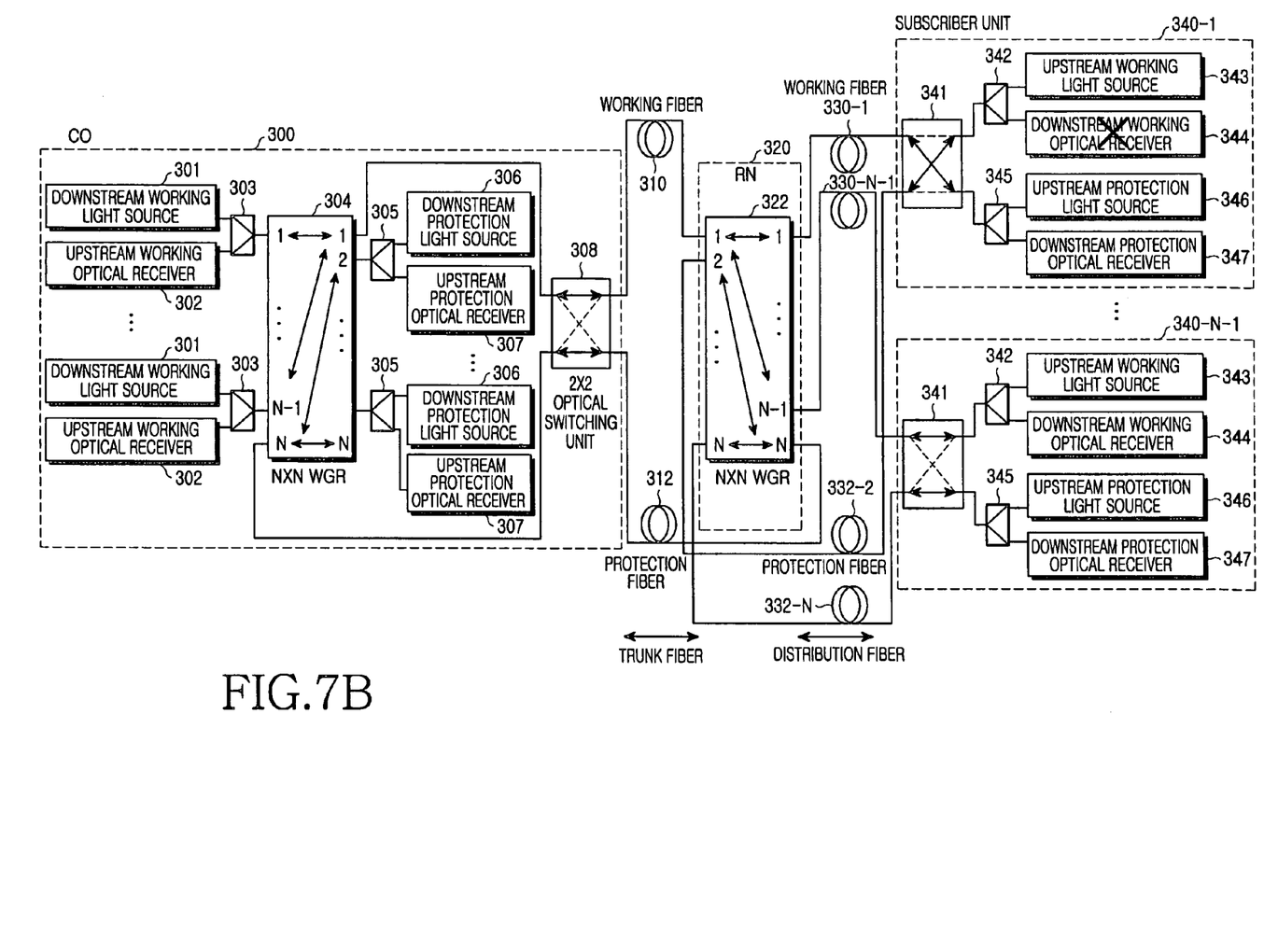

FIGS. 7a~7b are block diagrams illustrating operations performed if a communication failure occurs in internal elements of the subscriber unit of the WDM-PON system in accordance with one embodiment of the present invention. FIG. 7a is a block diagram illustrating a process performed when an error or communication failure occurs in the upstream working light source of the subscriber unit, and FIG. 7b is a block diagram illustrating a process performed if an error or communication failure occurs in the downstream working optical receiver of the subscriber unit.

Referring to FIG. 7a, if an error or communication failure occurs in the upstream working light source 343 contained in the subscriber unit 340-1, an output signal applied to a corresponding upstream working optical receivers 302 contained in the CO 300 will not be received. Thus, the 2×2 optical switching unit 341 contained in the subscriber unit 340-1 changes its current state into a cross state. At the same time, the upstream protection light source 346 and the downstream protection optical receiver 347 contained in the subscriber unit 340-1 are driven in such a way that the CO 300 can communicate with the subscriber unit 340-1.

Referring to FIG. 7b, if an error or communication failure occurs in the downstream working optical receiver 344 contained in the subscriber unit 340-1, an output signal applied to the downstream working optical receiver 344 is not received. Thus, the WDM-PON system changes a current state of the 2×2 optical switching unit 341 contained in the subscriber unit 340-1 into a cross state in such a way that the CO can communicate with the subscriber unit over the protection fiber 332-2. In this case, provided that the output signal applied to the downstream working optical receiver 344 is not received, the WDM-PON system operates the upstream protection light source 346 and the downstream protection optical receiver 347 in such a way that the CO 300 can communicate with the subscriber unit 340-1.

Figure 8A:
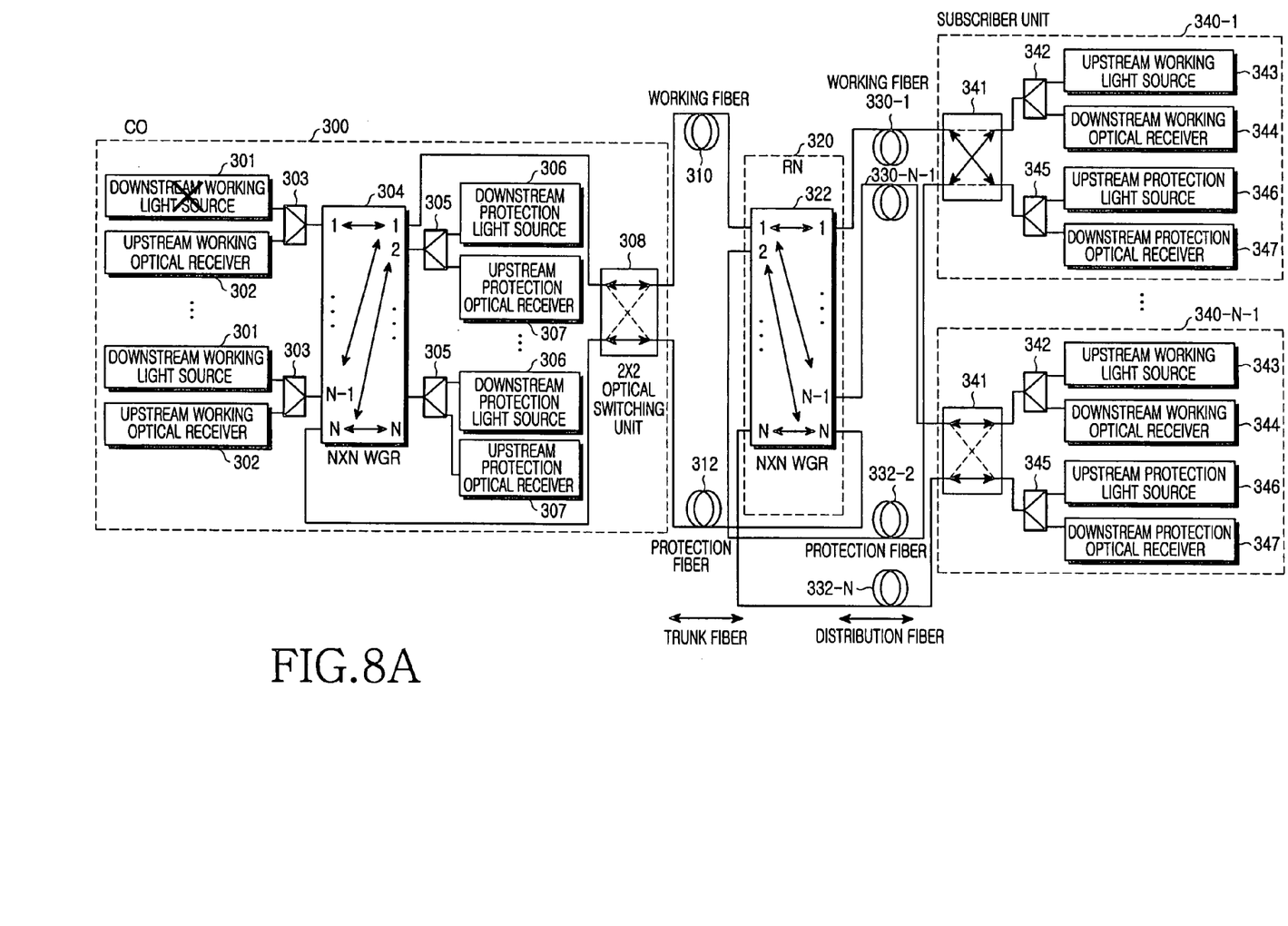
FIGS. 8a~8b are block diagrams illustrating operations performed when a communication failure occurs in internal elements contained in the CO of the WDM-PON system in accordance with one embodiment of the present invention.
Figure 8B:
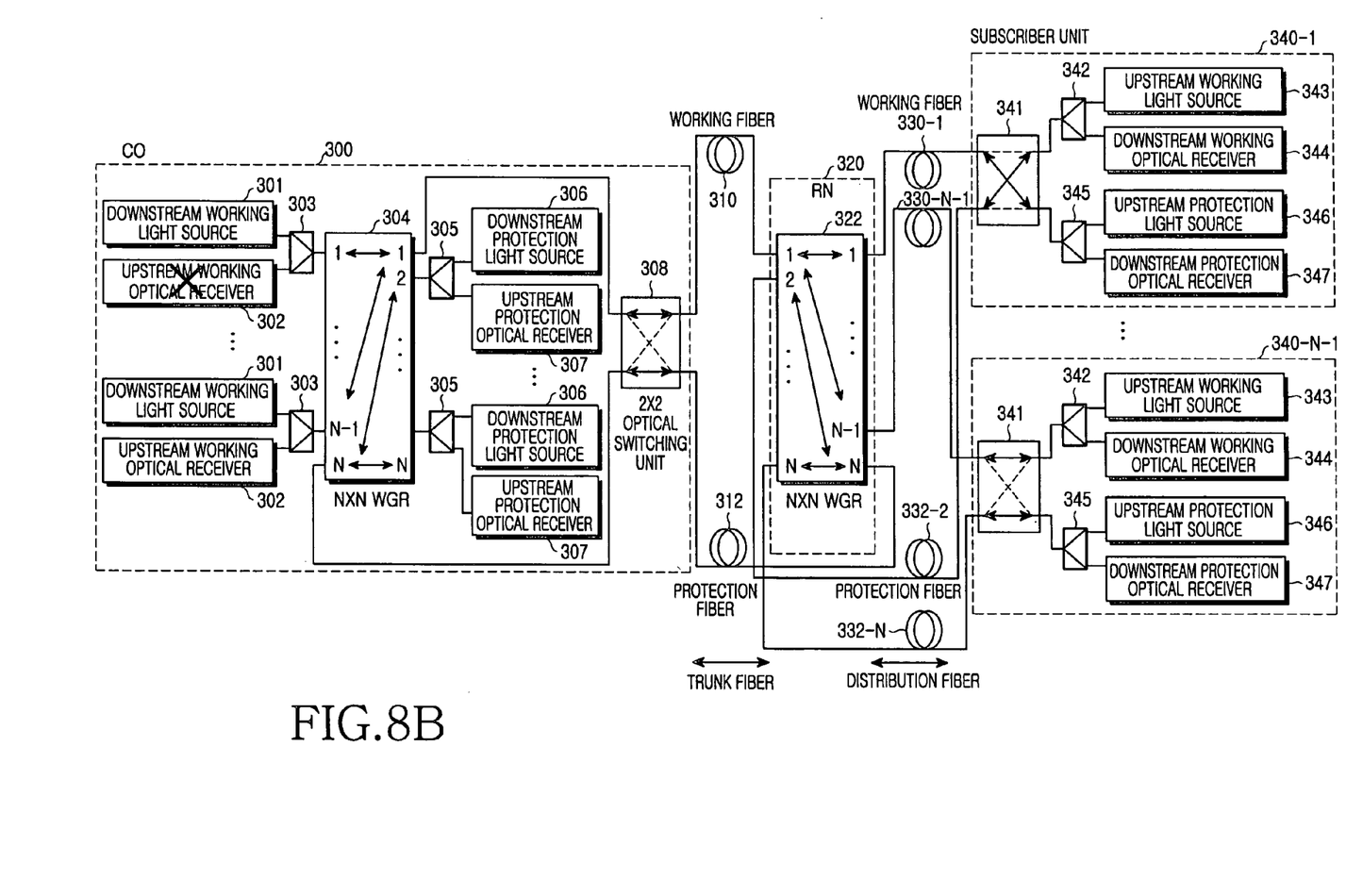

FIGS. 8a~8b are block diagrams illustrating operations performed when a communication failure occurs in internal elements of the CO of the WDM-PON system in accordance with a preferred one of the present invention. FIG. 8a is a block diagram illustrating a process performed when an error or communication failure occurs in either one of a plurality of downstream working light sources of the CO, and FIG. 8b is a block diagram illustrating a process performed when an error or communication failure occurs in either one of a plurality of upstream working optical receivers of the CO.

Referring to FIG. 8a, if an error or communication failure occurs in either one of a plurality of downstream working light sources 301 contained in the CO 300, an output signal from a downstream working light source 301 will not be received by a corresponding downstream working optical receiver 344 contained in the subscriber unit 340-1. Thus, the downstream protection light source 306 and the upstream protection optical receiver 307 contained in the CO 300 are driven, and at the same time the 2×2 optical switching unit 341 contained in the subscriber unit 340-1 changes its current state into a cross state in such a way that the CO 300 can communicate with the subscriber unit 340-1 over the distribution protection fiber 332-2.

Referring to FIG. 8b, if an error or communication failure occurs in either one of a plurality of upstream working optical receivers 302 contained in the CO 300, an output signal sent to that upstream working optical receiver 302 is not be received. Thus, the WDM-PON system changes a current state of the 2×2 optical switching unit 341 contained in the subscriber unit 340-1 into a cross state in such a way that the CO 300 communicates with the subscriber unit 340-1 over the distribution protection fiber 332-2. In this case, provided that the output signal of the upstream working optical receiver 302 contained in the CO 300 is not received, the WDM-PON system operates the downstream protection light source 306 and the upstream protection optical receiver 307 in such a way that the CO 300 can communicate with the subscriber unit 340-1 over the distribution protection fiber 332-1.

As apparent from the above description, using one N×N WGR, an upstream/downstream protection optical transceiver contained in the CO and the subscriber unit, and a protection fiber for connecting the CO with a subscriber, the self-healing WDM-PON system according to the present invention detects an error or communication failure created between an optical fiber for connecting the CO with the subscriber unit and an upstream/downstream optical transceiver contained in each of the CO and the subscriber unit, and recovers from the detected error or communication failure, resulting in a cost-effective WDM-PON system capable of being effectively administered and of recovering from the error or communication failure.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A self-healing WDM (Wavelength Division Multiplexing)-PON (Passive Optical Network) apparatus having a CO (Central Office), a RN (Remote Node) and a plurality of subscriber units, comprising:
   a trunk working fiber and a trunk protection fiber for connecting the CO with the RN; and
   a distribution working fiber and a distribution protection fiber for connecting the RN with the subscriber units,
   wherein the CO contains a 2×2 optical switching unit switched if an error or communication failure occurs, an upstream working optical receiver and an upstream protection optical receiver for receiving upstream data, and a downstream working light source and a downstream protection light source for transmitting downstream data, and
   wherein each of the subscriber units contains a 2×2 optical switching unit switched if an error or communication failure occurs, a downstream working optical receiver and a downstream protection optical receiver for receiving downstream data, and an upstream working light source and an upstream protection light source for transmitting upstream data.

2. The apparatus as set forth in claim 1, wherein the CO further contains an N×N multiplexer/demultiplexer for multiplexing/demultiplexing upstream/downstream working/protection signals.

3. The apparatus as set forth in claim 1, wherein the RN contains an N×N multiplexer/demultiplexer for demultiplexing multiplexed downstream working/protection signals received from the CO, and multiplexing upstream working/protection signals transferred from the subscriber unit.

4. The apparatus as set forth in claim 1, wherein the CO and the subscriber units each further contain a wavelength division multiplexer (WDM) for adding/dropping upstream/downstream working signals, and another WDM for adding/dropping upstream/downstream protection signals.

5. The apparatus as set forth in claim 2 or 3, wherein the N×N multiplexer/demultiplexer is a WGR (Waveguide Grating Router).

6. The apparatus as set forth in claim 1, wherein, if an error or communication failure occurs in a working fiber connecting the CO with the RN, the 2×2 optical switching unit contained in the CO and subscriber unit changes to a connection state, such that the CO communicates with the subscriber unit via a protection fiber.

7. The apparatus as set forth in claim 1, wherein, if an error or communication failure occurs in a working fiber connecting the RN with a subscriber unit, the 2×2 optical switching unit contained in the subscriber unit changes to a connection state such that the CO communicates with the subscriber unit via a protection fiber.

8. The apparatus as set forth in claim 1, wherein, if an error or communication failure occurs in a working fiber connecting the RN with a subscriber unit, the 2×2 optical switching unit contained in each subscriber unit and remaining subscriber units and the 2×2 optical switching unit contained in the CO changes to correction states, such that the CO communicates with the subscriber unit and the remaining subscriber units via a protection fiber.

9. The apparatus as set forth in claim 1, wherein, if an error or communication failure occurs in an upstream working light source contained in a subscriber unit, the 2×2 optical switching unit contained in the subscriber unit changes to a connection state, and the upstream protection light source and the downstream protection optical receiver are driven such that the CO communicates with the subscriber unit.

10. The apparatus as set forth in claim 1, wherein, if an error or communication failure occurs in the downstream working optical receiver contained in the subscriber unit, the 2×2 optical switching unit contained in the subscriber unit changes to a connection state and the upstream protection light source and the downstream protection optical receiver are driven to perform communication between the CO and the subscriber unit.

11. The apparatus as set forth in claim 1, wherein, if an error or communication failure occurs in the downstream working light source contained in the CO, the downstream protection light source and the upstream protection optical receiver are driven, and the 2×2 optical switching unit contained in the subscriber unit changes to a connection state, such that the CO communicates with the subscriber unit.

12. The apparatus as set forth in claim 1, wherein, if an error or communication failure occurs in the upstream working optical receiver contained in the CO, the 2×2 optical switching unit contained in the subscriber unit changes to a connection state and the downstream protection light source and the upstream protection optical receiver are driven to perform communication between the CO and the subscriber unit.

13. The apparatus as set forth in claim 1, wherein, if an error or communication failure occurs in the downstream working light source contained in the CO, the downstream protection light source and remaining downstream protection light sources are driven, and the 2×2 optical switching unit contained in the CO changes to a connection state, such that the CO communicates with the subscriber unit and remaining subscriber units.

14. The apparatus as set forth in claim 1, wherein, if an error or communication failure occurs in the upstream working optical receiver contained in the CO, the 2×2 optical switching unit contained in the CO changes to a connection state and the downstream protection light source and remaining downstream protection light sources are driven to perform communication between the CO and the subscriber unit and remaining subscriber units.

15. A self-healing WDM (Wavelength Division Multiplexing)-PON (Passive Optical Network) apparatus having a CO (Central Office), a RN (Remote Node) and a plurality of subscriber units, comprising:
   a trunk working fiber and a trunk protection fiber for connecting the CO with the RN;
   a distribution working fiber and a distribution protection fiber for connecting the RN with the subscriber units; and
   an N×N multiplexer/demultiplexer for multiplexing/demultiplexing upstream/downstream working/protection signals,
   wherein the CO contains an upstream working optical receiver for receiving upstream data, a downstream working light source for transmitting downstream data, a first optical switching unit for switching to a connection state so that the CO communicates with a subscriber via the trunk protection fiber if an error or communication failure occurs in the trunk working fiber, and wherein each of the subscriber units contain a downstream working optical receiver for receiving downstream data, an upstream working light source for transmitting upstream data and a second optical switching unit for switching to a connection state so that the CO communicates with a subscriber via the distribution protection fiber if an error or communication failure occurs in the distribution working fiber.

16. The apparatus as set forth in claim 15, wherein the CO further contains a downstream protection light source and an upstream protection optical receiver.

17. The apparatus as set forth in claim 15, wherein each of the subscriber units further contain an upstream protection light source and a downstream protection optical receiver.

18. The apparatus as set forth in claim 15, wherein the CO and the subscriber units each further contain a wavelength division multiplexer (WDM) for adding/dropping upstream/downstream working signals, and another WDM for adding/dropping upstream/downstream protection signals.

19. The apparatus as set forth in claim 15, wherein the N×N multiplexer/demultiplexer is a WGR (Waveguide Grating Router).

* * * * *